United States Patent

Appel

[11] 4,359,267
[45] Nov. 16, 1982

[54] METHOD OF ASSEMBLING A GRADIENT INDEX LENS ARRAY

[75] Inventor: James J. Appel, Ontario, N.Y.

[73] Assignee: Xerox Corporation, Stamford, Conn.

[21] Appl. No.: 162,986

[22] Filed: Jun. 25, 1980

[51] Int. Cl.³ .............................................. G02B 5/17
[52] U.S. Cl. .................................. 350/320; 350/96.25; 350/96.31; 427/163
[58] Field of Search ............... 350/96.24, 96.25, 96.27, 350/96.31, 320; 427/163

[56] References Cited

U.S. PATENT DOCUMENTS

| | | | |
|---|---|---|---|
| 3,253,896 | 5/1966 | Woodcock et al. | 350/96.24 X |
| 3,436,142 | 4/1969 | Siegmund et al. | 350/96.25 |
| 3,658,407 | 4/1972 | Kitano et al. | 350/96.25 |
| 3,950,074 | 4/1976 | Tanaka | 350/96.25 |
| 4,258,978 | 3/1981 | Cole | 350/96.25 |
| 4,331,380 | 5/1982 | Rees et al. | 350/96.25 |

FOREIGN PATENT DOCUMENTS

| | | | |
|---|---|---|---|
| 561918 | 8/1958 | Canada | 350/96.25 |
| 1270343 | 4/1972 | United Kingdom | . |
| 1489420 | 10/1977 | United Kingdom | . |
| 2023302 | 12/1979 | United Kingdom | . |

OTHER PUBLICATIONS

Japanese Patent Abstracts, vol. 3, No. 25, Feb. 28, 1979, p. 161E94, (Pat. No. JP-A-54-3557).
Kawazu et al., "Application of Gradient-Index Fiber Arrays to Copying Machines", *Applied Optics*, vol. 19, No. 7, Apr. 1980, pp. 1105-1112.

Primary Examiner—John D. Lee

[57] ABSTRACT

A plurality of gradient index fibers are assembled into a lens array by first coating each fiber with a light absorbent medium to a desired thickness and then pressing the coated fibers into a final mold. The coating step permits greater inter-fiber distance to be effected for certain applications.

1 Claim, 3 Drawing Figures

METHOD OF ASSEMBLING A GRADIENT INDEX LENS ARRAY

BACKGROUND AND PRIOR ART STATEMENT

The present invention relates to gradient index optical fibers and more particularly, to a method of assembling an array of fibers to form an imaging lens array which transmits an image of an object at an object plane to an image plane.

Image transmitters comprising bundled gradient index optical fibers are known in the art. U.S. Pat. No. 3,658,407 describes a light conducting fiber made of glass or synthetic resin which has a refractive index distribution in a cross section thereof that varies consecutively and parabolically outward from a center portion thereof. Each fiber acts as a focusing lens to transmit part of an image placed at, or near, one end. An assembly of fibers, in a staggered two-row array, transmit and focus a complete image of the object. The fiber lenses are produced under the trade name "SELFOC"; the mark is registered in Japan and owned by Nippon Sheet Glass Co., Ltd..

These gradient index lens arrays have found use in a number of technologies; e.g. in construction of printed type electrical circuits as disclosed in U.S. Pat. No. 3,922,062 and as a replacement for conventional optical systems in copiers as disclosed in U.S. Pat. Nos. 3,947,106 and 3,977,777.

The lens arrays used as optical systems in commercial copiers, e.g. Minolta EG301, Eskofot 1001, are typically assembled into a bundled two-row configuration by first manufacturing optical fibers having the required length and gradient index and then pressing the fibers together into an epoxy or resin mold. The fibers are separated by a distance in the order of 0.0319 mm when subjected to the maximum pressure permissable without injury to the fibers. The state of the art development of these arrays has heretofore been directed towards assembling these gradient index fibers in as close a proximity as possible. It has been discovered, however, as set forth in co-pending application U.S. Ser. No. 159,993 filed by William L. Lama on June 26, 1980 and assigned to the same assignee as the present invention, that the fiber spacing can be advantageously set at other values, some quite large relative to the present fiber spacing. More specifically, for a given gradient index lens fiber parameters ($\sqrt{A}$, L, R) the exposure modulations onto an image plane can be minimized for a unique, but not obvious value of fiber spacing parameter b. The value of b is defined in the aforementioned application whose contents are herein incorporated by reference. For small inter-fiber spacings which do not greatly exceed the state-of-the-art spacing, a satisfactory spacing may be achieved simply by increasing the viscosity of the resin used in the assembly mold. However, for larger value of b, this expedient may not be sufficient.

It is, therefore, an object of the present invention to provide a method of assembling gradient index fibers into a lens array.

It is a further object to provide spacings between fibers which are larger then present known arrays.

SUMMARY

These objects are attained by a method of assembling gradient index optical fibers into a lens array by first providing each fiber with a coating of an inter-fiber light absorbent medium to a first thickness followed by a second step of pressing the coated fibers into a mold by conventional pressing methods. The inter-fiber spacing is thus the sum of twice the coating thickness plus the ultimate gap between each pair of coated fibers.

DRAWINGS

DESCRIPTION

Figure 1:
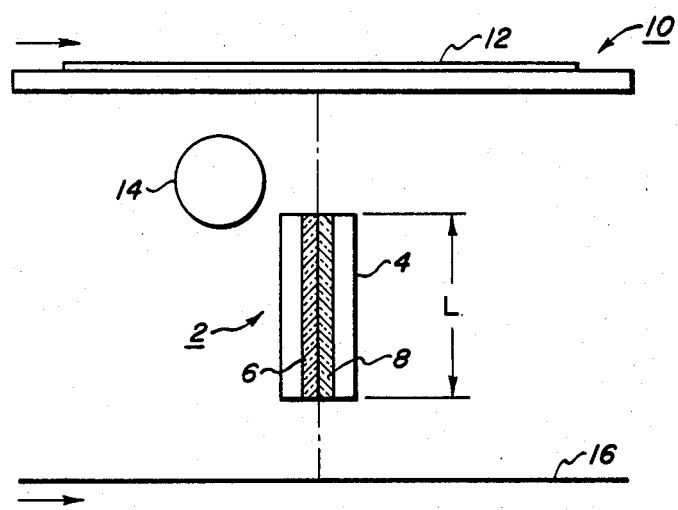
FIG. 1 is an end schematic view of a prior art gradient index lens array in an imaging system.

Referring now to FIG. 1, there is shown, in side view, a prior art optical imaging system 2 which includes a gradient index lens array 4 comprising two staggered rows 6,8 of gradient index fibers arranged in a bundled configuration as is known in the prior art. Transparent object plane 10 is adapted for movement past lens 4 in the indicated direction. Plane 10 has an object 12, which may be a document, supported thereon. Lamp 14 provides an intense narrow band of illumination through an aperture (not shown) across the width of the object plane 10.

Figure 2:
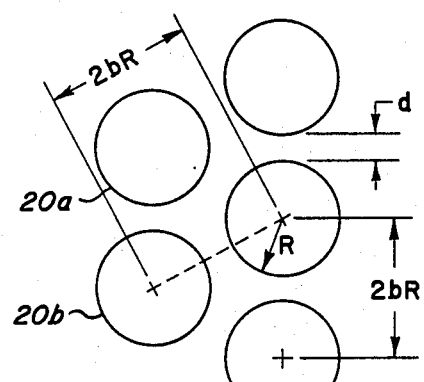
FIG. 2 is a schematic top end view (enlarged) of a portion of the lens array of FIG. 1.

In operation, plane 10 is moved across the illuminated area at a speed synchronous with that of a photosensitive imaging plane 16. A narrow strip of light is reflected from object 12 and focused by lens 4 onto plane 16. FIG. 2 is an end view, (enlarged), of a portion of lens 4 looking downward through the lens.

Each fiber 20 (approximately 200) has the following parameters: $A=0.1275$ mm$^{-1}$, $L=28.99$ mm, $R=0.5325$ and spacing d between fibers of 0.03195 mm. The term A is the gradient index constant and L is the optical fiber length in the Z direction. Overlap parameters (a) as defined by the Equation $(a) = -\sec(\sqrt{A}\,L/2)$ is 3.635 and fiber spacing b, as defined by the Equation $$(b) = \frac{2\,(a)}{S\,(S+1)} \text{ is 1.03 where } S = 1,2,3,\ldots$$

is 1.03 where $S=1, 2, 3, \ldots$.

Figure 3:
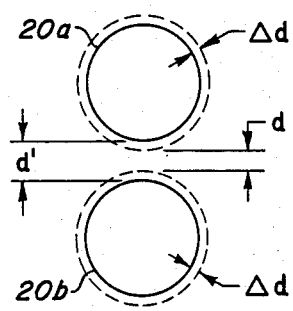
FIG. 3 is a schematic top end view (enlarged) of the portion of the lens array of FIG. 2 showing the increased inter-fiber spacing.

As disclosed in the Lama application supra, modulation for a system such as set forth above can be reduced from around 1.4% to 0.4% by increasing the fiber spacing parameter (b) from 1.03 to 1.12. This increase results in a new inter-fiber spacing value d' of 0.1278 mm or an increase of 0.09585. According to the present invention, and as shown in FIG. 3, this spacing may be achieved by the following method. Before assembly, each fiber is dipped into the inter-fiber spacing material, which may be a light absorbing black silicon resin, until a uniform coating Δd of 0.0479 mm (0.09585/2) is obtained. This coating is allowed to cure to full hardness. The fibers are then pressed together in a resin mold in the conventional manner. It is thus evident that the thickness Δd of the coating applied to each fiber (0.0479 mm×2) plus the original thickness d (0.03195) produces the final desired thickness d' of 0.1278 mm.

While the assembly method has been given for a specific example, it is obvious that other parameters and other coatings may be used. Also, the above method is particularly applicable in assembling single-row arrays of the type disclosed in the aforementioned Lama application.

What is claimed is:

1. A method of forming a gradient index lens array by joining together a plurality of gradient index optical fibers, each fiber separated from adjoining fibers by an inter-fiber spacing d′, comprising the steps of:

coating each of said fibers with a light absorbing material to a thickness $\Delta d$, curing said coating to full hardness and pressing said coated fibers into a mold of said light absorbing material until each coated fiber is separated by a distance d equal to d′ minus 2 $\Delta d$.

* * * * *